April 8, 1969     J. W. CHURCH     3,437,112
SINGLE HANDLE MIXING FAUCET
Filed May 29, 1967
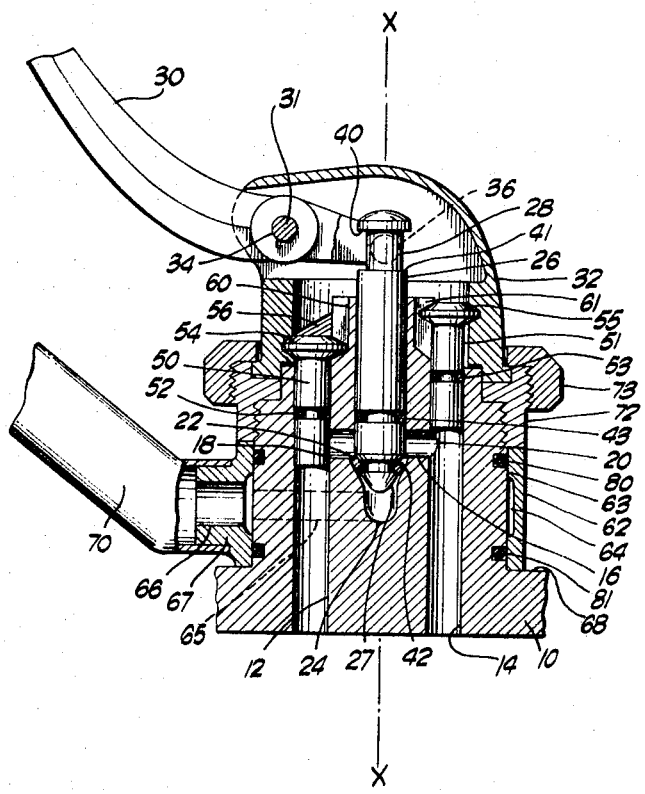
INVENTOR
JAMES W. CHURCH
By: Smart & Biggs
ATTORNEYS

United States Patent Office 3,437,112
Patented Apr. 8, 1969

3,437,112
SINGLE HANDLE MIXING FAUCET
James W. Church, Preston, Ontario, Canada, assignor to Wallaceburg Brass Limited, Wallaceburg, Ontario, Canada
Filed May 29, 1967, Ser. No. 642,112
Claims priority, application Canada, June 17, 1966, 963,240
Int. Cl. F16k 11/18
U.S. Cl. 137—636.2      7 Claims

ABSTRACT OF THE DISCLOSURE

A mixing faucet having a single handle which, when pivoted up or down, moves a flow control stem to control the volume of fluid leaving a mixing chamber through an outlet passage communicating therewith. A pair of proportioning stems, mounted for axial movement in a pair of inlet passages communicating with the mixing chamber, are movable up and down, via cam means, by rotation of the handle, to thereby control the relative amounts of fluid entering the mixing chamber from the inlet passages.

Background of the invention

This invention relates to a mixing faucet having a single handle which, when pivoted up and down, controls the total amount of fluid flowing through the faucet and, when rotated about the longitudinal axis of the faucet, controls the relative amounts of fluids flowing through the faucet from two sources, e.g. hot and cold water sources.

A number of single handle mixing faucets have been described by the prior art, for example in the following United States Patents:

1,511,974, Lindemann, Oct. 14, 1924
1,797,283, Bentley, Mar. 24, 1931
1,840,961, Kuenzler, Jan. 12, 1932
1,882,953, Saelzler, Oct. 18, 1932
2,575,940, Brown, Nov. 20, 1951
2,966,928, Fairchild, Jan. 3, 1961

Summary of the invention

According to the present invention there is provided a single handle mixing faucet comprising a body portion having first and second spaced inlet passages an outlet passage, and a mixing chamber. The mixing chamber has first and second openings communicating with the first and second inlet passages respectively and a third opening communicating with the outlet passage. A flow control stem is mounted for axial movement in the body portion between a fully open position and a fully closed position wherein one end of it seals off the third opening. First and second proportioning stems are mounted for axial movement in the first and second spaced passages respectively and are each movable between a fully open position and a fully closed position wherein it seals off said first or second opening respectively. A control mechanism is mounted on the body portion for rotation about the longitudinal axis of the faucet and is provided with a cam surface cooperating with stem heads on the proportioning stems. Rotation of the control mechanism causes the first and second proportioning stems to be raised and lowered in opposition to thereby control the relative amounts of fluid entering the mixing chamber from the first and second inlet passages. A handle is mounted on the control mechanism for pivoting about an axis transverse to the longitudinal axis of the faucet and is provided with cam means engageable with cam surfaces on the other end of the flow control stem. Pivoting of the handle about the transverse axis moves the flow control stem between the fully open and fully closed positions.

The control mechanism is adapted to be rotated about the longitudinal axis by means of the handle.

The cam surface on the control mechanism comprises groove means formed in the inner wall thereof. The flow control stem and the proportioning stems are preferably provided with sealing rings to prevent leakage of fluid therearound. The body portion may be provided with axially extending grooves accommodating the stem heads.

While the faucet could be provided with a fixed spout, it is preferred to secure the spout to an annular portion rotatably mounted on a cylindrical section of the body portion of the faucet so that the spout, together with the annular portion, may be rotated about the longitudinal axis of the faucet. A channel is formed around the inner surface of the annular portion and this channel communicates with the outlet passage and with the spout so that fluid may flow to the spout in any position about the longitudinal axis of the faucet. In this case, sealing rings are provided above and below the channel to prevent fluid leakage between the body portion and the annular portion.

Preferably, the said one end of the flow control stem is provided with a sealing ring to effect a tight sealing off of said third opening when the flow control system is in the fully closed position.

Brief description of the drawing

The single drawing figure is a side elevational view of a preferred embodiment of a faucet according to the invention, partly in cross section and partly cut away.

Description of the preferred embodiment

Referring to the drawing, it is seen that the faucet comprises a body portion 10 having first and second spaced inlet passages 12 and 14. These inlet passages are adapted to be connected with two fluid sources, e.g. hot and cold water sources (not shown).

A mixing chamber 16 in body portion 10 has first and second openings 18 and 20, respectively, communicating with the first and second inlet passages 12 and 14, respectively. A third opening 22 in mixing chamber 16 communicates with an outlet passage 24. A flow control stem 26 is mounted for axial movement in body portion 10 between a fully closed position as shown in the drawing wherein one end 27 seals off the third opening 22, and a fully open position wherein fluid entering the mixing chamber from either or both of the inlet passages may flow to the outlet passage 24. Flow control stem 26 is moved axially up and down by means of a handle 30 mounted on control mechanism 32 by means of shaft 34 for pivoting about an axis 31 which is transverse to the longitudinal axis X—X of the faucet. The end of handle 30 adjacent flow control stem 26 is yoke shaped, the arms of the yoke being disposed on opposite sides of flow control stem 26. In the drawing, the near arm has been shown partially cut-away. These arms are provided with cams means 36 which cooperate with cam surfaces 40 and 41 on flow control stem 26. It can be easily seen that if handle 30 is pivoted downwardly, cam means 36 will cooperate with cam surface 40 to raise flow control stem 26. Similarly, if handle 30 is pivoted upwardly, cam means 36 will cooperate with cam surface 41 to lower flow control stem 26. Cam means 36 are contained within the reduced portion 28 of flow control stem 26 so that handle 30 together with control mehcanism 32 may be rotated about the longitudinal axis X—X of the faucet without rotation of flow control stem 26.

The end 27 of flow control stem 26 is preferably provided with a sealing ring 42 to effect a tight sealing-off of opening 22 when flow control stem 26 is in the lower or fully closed position. A further sealing ring 43 ensures against leakage of fluid from mixing chamber 16 around flow control stem 26.

Proportioning stems 50 and 51 are provided in the first and second inlet passages 12 and 14, respectively, and are preferably provided with sealing rings 52 and 53 respectively to prevent leakage therearound. Stem heads 54 and 55 are provided on proportioning stems 50 and 51 as shown in the drawing. The stem heads 54 and 55 cooperate with a cam surface 56 comprising groove means formed in the inner wall of control mechanism 32. Such groove means comprises two cam portions, one right-handed rising and the other left-handed rising so that when control mechanism 32 is rotated stem head 54 together with stem 50 is moved upwardly while, at the same time, stem head 55 together with stem 51 is moved downwardly, and vice versa. The upper and lower ends of the two cam portions may, if desired, be joined together either directly or by means of dwell regions It will be understood that if dwell regions are provided, rotation of control mechanism 32 through a limited range will be possible without changing the relative heights of proportioning stems 50 and 51. In the position shown in the drawing, proportioning stem 50 completely blocks the entry of fluid from the first inlet passage 12 into mixing chamber 16 whereas proportioning stem 51 is fully open to allow fluid from inlet passage 14 to flow to mixing chamber 16. The stem heads 54 and 55 are accommodated by axially extending grooves 60 and 61 formed in body portion 10 although conceivably the upper part of body portion 10 could simply be of reduced cross-section. The stem heads 54 and 55 are conveniently of circular shape and hence grooves 60 and 61 may comprise circular arcs.

In this preferred embodiment, an annular portion 62 is provided on cylindrical section 63 of body portion 10 and is rotatable about the longitudinal axis X—X of the faucet. A channel 64 is formed around the inner surface of annular portion 62 and communicates with outlet passage 24 as schematically indicated by the dotted line hole 65. In actuality, of course, outlet passage 24 comprises a hole or a plurality of holes drilled diametrically from the outer surface of body portion into the center so as to communicate with the third opening 22. It will be readily understood that fluid can flow, when flow control stem is raised, from mixing chamber 16, through opening 22 and outlet passage 24 to the channel 64 and thence through passage 66 to a spout 70 which is secured, as by soldering, to an annular extension 67 formed on annular portion 62.

The annular portion 62 is retained in position on a shoulder 68 on body portion 10 by means of a ring portion 72 threadably engaged with body portion 10. A retaining ring 73, threadably secured on ring 72, retains the control mechanism 32 in position as clearly seen in the drawing. Control mechanism 32 is, of course, free to rotate about the longitudinal axis X—X of the faucet.

Sealing rings 80 and 81 are provided above and below channel 64, respectively, to prevent leakage of fluid from the channel 64.

Mixing chamber 16 may be formed by drilling a hole diametrically through inlet passages 12 and 14 from the outer surface of body portion 10, the resulting hole in the outer wall of body portion 10 being then plugged in any suitable manner, e.g. a soldered plug.

Assuming the faucet is to be used for mixing hot and cold water, it can be seen that the temperature of the water leaving spout 70 can be controlled by rotating control mechanism 32 by means of handle 30 to thereby vary the relative heights of proportioning stems 50 and 51. The volume of flow reaching the spout 70 can be controlled by raising or lowering handle 30 and hence flow control stem 26.

What I claim as my invention is:

1. A single handle mixing faucet comprising a body portion having first and second spaced inlet passages, an outlet passage, and a mixing chamber, said mixing chamber having first and second openings communicating with said first and second inlet passages respectively and a third opening communicating with said outlet passage, a flow-control stem mounted for axial movement in said body portion between a fully open position and a fully closed position wherein one end of it seals off said third opening, first and second proportioning stems mounted for axial movement in said first and second spaced passages respectively and each being movable between a fully open position and a fully closed position wherein it seals off said first or second opening respectively, a control mechanism mounted on said body portion for rotation about the longitudinal axis of the faucet and having a cam surface cooperating with stem heads on said proportioning stems, rotation of said control mechanism causing said first and second proportioning stems to be raised and lowered in opposition to thereby control the relative amounts of fluid entering said mixing chamber from said first and second inlet passages, a handle being mounted on said control mechanism for pivoting about an axis transversely to said longitudinal axis and having cam means engageable with cam surfaces on the other end of said flow control stem, pivoting of said handle about said transverse axis moving said flow control stem between said fully open and said fully closed position.

2. A faucet as claimed in claim 1 wherein said control mechanism is adapted to be rotated by means of said handle.

3. A faucet as claimed in claim 1 wherein the cam surface on said control mechanism comprises groove means formed around the inner wall thereof.

4. A faucet as claimed in claim 1 wherein said flow-control stem and said proportioning stems are provided with sealing rings.

5. A faucet as claimed in claim 1 wherein axially extending grooves are provided in said body portion, said grooves accommodating said stem heads.

6. A faucet as claimed in claim 5 wherein said body portion has a cylindrical section on which is mounted an annular portion having a channel formed around its inner surface, said annular portion being rotatable about said longitudinal axis, said cylindrical section being provided with sealing rings above and below said channel, said channel communicating with said outlet passage and with a spout secured to said annular portion.

7. A faucet as claimed in claim 6 wherein said one end of said flow-control stem is provided with a sealing ring.

References Cited

UNITED STATES PATENTS

| | | | |
|---|---|---|---|
| 831,049 | 9/1906 | Fitzgibbon | 137—636.3 X |
| 1,577,355 | 3/1926 | Palfy | 137—636.2 |
| 2,575,305 | 11/1951 | Stryzakoski | 137—636.3 |
| 2,756,775 | 7/1956 | Hyde | 137—636 |
| 2,781,783 | 2/1957 | Ross | 137—636.2 |
| 2,879,801 | 3/1959 | Cornelius | 137—636.2 |

CLARENCE R. GORDON, *Primary Examiner.*

U.S. Cl. X.R.

137—636.3